(12) United States Patent  (10) Patent No.: US 7,447,931 B1
Rischar et al.  (45) Date of Patent: Nov. 4, 2008

(54) STEP TIME CHANGE COMPENSATION IN AN INDUSTRIAL AUTOMATION NETWORK

(75) Inventors: Charles M. Rischar, Chardon, OH (US); Kendal R. Harris, Mentor, OH (US); Mark Chaffee, Chagrin Falls, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 116 days.

(21) Appl. No.: 11/279,320

(22) Filed: Apr. 11, 2006

Related U.S. Application Data

(60) Provisional application No. 60/749,318, filed on Dec. 9, 2005.

(51) Int. Cl.
*H04J 3/06* (2006.01)

(52) U.S. Cl. .................. 713/400; 713/500; 368/46; 368/47; 370/509; 375/354

(58) Field of Classification Search ............ 713/400, 713/500; 368/46, 47; 370/509, 503; 375/354
See application file for complete search history.

(56) References Cited

U.S. PATENT DOCUMENTS

| | | | |
|---|---|---|---|
| 4,352,181 A | 9/1982 | Le Dieu et al. | |
| 4,565,454 A | 1/1986 | Walters | |
| 4,747,050 A | 5/1988 | Brachtl et al. | |
| 4,989,133 A | 1/1991 | May et al. | |
| 6,055,246 A | 4/2000 | Jones | |
| 6,421,334 B1 | 7/2002 | Baines | |
| 6,469,665 B2 | 10/2002 | Porcino | |
| 6,553,066 B1 | 4/2003 | Pollet et al. | |
| 7,000,031 B2 * | 2/2006 | Fischer et al. | 709/248 |
| 7,191,354 B2 * | 3/2007 | Purho | 713/400 |
| 7,254,646 B2 * | 8/2007 | Aguilera et al. | 709/249 |
| 2002/0027886 A1 * | 3/2002 | Fischer et al. | 370/255 |
| 2004/0042499 A1 | 3/2004 | Piercy et al. | |
| 2004/0233785 A1 | 11/2004 | Szajnowski | |
| 2005/0015424 A1 * | 1/2005 | Aguilera et al. | 709/200 |
| 2005/0207387 A1 * | 9/2005 | Middleton et al. | 370/347 |
| 2006/0242445 A1 * | 10/2006 | Aweya et al. | 713/400 |
| 2006/0245454 A1 * | 11/2006 | Balasubramanian et al. | 370/509 |
| 2007/0061018 A1 * | 3/2007 | Callaghan et al. | 700/1 |
| 2007/0076724 A1 * | 4/2007 | Hall et al. | 370/395.52 |

* cited by examiner

*Primary Examiner*—Gary F. Paumen
(74) *Attorney, Agent, or Firm*—Amin Turocy & Calvin LLP; R. Scott Speroff

(57) ABSTRACT

One or more embodiments provide Common Industrial Protocol (CIP) based time synchronization systems and methods. The CIP Sync solution can be part of Ethernet/IP and can be based on standard UDP (User Datagram Protocol) and/or IEEE 1588 (Time Synchronization) Ethernet technology. According to an embodiment is a system that compensates for step changes in a master clock.

32 Claims, 13 Drawing Sheets

| COMPENSATION FOR TIMESTAMP AT SINGLE NODE | | | |
|---|---|---|---|
| INDEX | MASTER TIME | TIMESTAMP | OFFSET |
| T0 | 100 | 100 | 0 |
| T1 | 200 | 200 | 0 |
| T2 | 1300 | 1300 | 1000 |
| T3 | 1400 | 1400 | 1000 |

FIG. 5

| INTERVAL | MASTER TIME | SOURCE NODE | | | | | DESTINATION NODE | | | | |
|---|---|---|---|---|---|---|---|---|---|---|---|
| | | LOCAL CLOCK | OFFSET | LAST OFFSET | SYSTEM TIME | SENT TIMESTAMP | LOCAL CLOCK | OFFSET | LAST OFFSET | SYSTEM TIME | RECEIVED TIMESTAMP |
| T1 | 0 | 0 | 0 | 0 | 0 | 0 | 0 | 0 | 0 | 0 | 0 |
| T2 | 100 | 100 | 0 | 0 | 100 | 100 | 100 | 0 | 0 | 100 | 100 |
| T3 | 200 + 1000 | 200 | 0 + 1000 | 0 | 1200 | 1200 | 200 | 0 | 0 | 200 | 200 |
| T4 | 1300 | 300 | 1000 | 0 | 1300 | 1300 | 300 | 0 + 1000 | 0 | 1300 | 1300 |
| T5 | 1400 | 400 | 1000 | 1000 | 1400 | 1400 | 400 | 1000 | 1000 | 1400 | 1400 |

FIG. 6

STEP TIME CHANGE COMPENSATION IN AN INDUSTRIAL AUTOMATION NETWORK

CROSS-REFERENCE TO RELATED APPLICATIONS

This application claims the benefit of U.S. Provisional Patent Application Ser. No. 60/749,318 entitled "STEP TIME CHANGE COMPENSATION IN AN INDUSTRIAL AUTOMATION NETWORK" and filed Dec. 9, 2005.

TECHNICAL FIELD

The following description relates generally to time synchronization technology and more particularly to compensation for system step changes across a network of distributed devices in order to accurately represent time.

BACKGROUND

Synchronized time is critical in the motion control and other industries as companies continue to develop systems and methods for obtaining higher degrees of device interoperability. This is significant for companies that employ distributed motion control applications requiring tight time synchronization between system devices. This need for higher performance applications is coupled with the necessity for synchronizing clocks across a distributed network (e.g., Ethernet). Every aspect of managing, securing, planning and troubleshooting a network system can involve determining when events happen. High-performance motion control networks demand tightly managed, real-time synchronization across multiple axes. Test, measurement, and control systems can involve the exchange of information between devices, such as controllers, sensors and actuators and proper operation of these systems requires that the associated time interactions of the various devices be understood. The Ethernet has been employed in industrial automation systems in part resulting from its ease of use. The basic structure has not changed a great deal since its inception and faster technologies such as Fast Ethernet and Gigabit Ethernet have increased the choices available in planning and designing these systems at an enterprise level.

Various protocols exist for defining how to distribute time across a set of distributed devices, such as American Inter Range Instrumentation Group (IRIG-B), Network Time Protocol (NTP), Telecommunications Working Group (TCWG), Global Positioning System (GPS), etc. All of these protocols provide different quality of time coordination. The IEEE 1588 standard Precision Time Protocol (PTP) was developed to synchronize independent clocks running on a distributed control network to a high degree of accuracy and precision (e.g., measurement and control devices). Utilizing IEEE 1588, allows clock synchronization to the sub-microsecond (nanosecond) range, however, an underlying requirement is that each machine control system must have a precise and stable clock. Existing time synchronization protocols such as NTP and SNTP do not achieve a high level of synchronization accuracy or convergence speed.

The PTP protocol generates a master slave relationship among clocks in a system and within a given subnet of a network there will be a single master clock. One clock on each subnet in the system is selected as the master clock. This selection can be made by the other subnet clocks by examining information contained in special timing messages termed sync (or synchronization) messages. A sync message is sent periodically by any port associated with the clock claiming to be the master clock, and all ports use an algorithm to evaluate the sync message, termed the best clock algorithm. If a port of a master clock receives a sync message from a better (e.g., more accurate) clock, then that port will cease to be the master clock and that receiving port will assume the status of a slave port. Likewise the clock with the now designated slave port acts as a slave clock and ultimately all of the aforementioned clocks on the network derive their time from the grandmaster clock (the best master clock).

Today's time synchronization protocols, including the IEEE 1588, are not without deficiencies with respect to step changes in time. In particular, those protocols do not account for step changes in the master clock, (e.g., the clock is changed manually, the clock loses the time reference satellite for a given time period, etc.). Any step change seen by the master clock will also be seen by the associated slave clocks and this makes it difficult for the system to perform certain control functions. For example, a step change taking place between two events, which occurred at the same instant in time, could be seen by two independent clocks as occurring at two different times. In yet another example, if step change occurred between two occurrences of the same event it would be difficult to calculate the interval between the two events.

Furthermore, there is a trend in the motion control industry to make the control of information from control subsystems up to the enterprise level as seamless as possible. In order for that information to be of the highest value to the business, it has to allow everyone to have the same meaning or reference with respect to time. In yet another example, when a failure occurs in high speed or unsupervised machinery it is difficult or nearly impossible to tell how the failure occurred without an understanding of the absolute time of the machinery. There may be a large number of faults that have occurred and the only way for the enterprise to know which fault caused the failure is to look at the timestamps of the fault events (e.g., did the packaging machine or the conveyor shut down first?). In other words, even if events were timestamped using one of the aforementioned protocols, the timestamps may not be correct due to step changes in the system time.

Determining real-world time is critical for many applications such as pharmaceutical applications, for example, where regulatory requirements dictate that process steps be timed (e.g., heating, mixing, compression time, time involved in adding ingredients, etc.). Step changes in a master clock may result in having to discard otherwise high-quality product if those step changes that occurred can not be determined accurately. In addition, systems or networks are often made up of equipment from various manufacturers and in many instances each manufacturer can have its own specific time logging system, further compounding time synchronization problems.

In many sophisticated motion control systems, the system is often controlling devices so that the devices operate in a synchronized manner. Some examples include the controlling of the position of multiple motors shafts at a point in time, a pick and place operation where the conveyor linear rate is timed to coincide with the robot picking up a part off the conveyor, one robot grasping a panel just before the other robot releases the panel, etc. All of these systems can have various outcomes if a step change is introduced into the system time and the equipment becomes out of synchronization. In one application, printing newspapers, the outcome can be, for example, printing misalignment, colors not looking right, paper being torn, etc. In a steel rolling application the consequence may be much worse, resulting in motor failures, premature wear, roller damage, total equipment failure, costly machine rebuilding, etc.

Therefore, there is a need to overcome the aforementioned as well as other deficiencies associated with conventional systems and devices and time synchronization.

SUMMARY

The following presents a simplified summary of one or more embodiments in order to provide a basic understanding of some aspects of such embodiments. This summary is not an extensive overview of the one or more embodiments, and is intended to neither identify key or critical elements nor to delineate the scope of the embodiments. Its sole purpose is to present some concepts of the described embodiments in a simplified form as a prelude to the more detailed description that is presented later.

In accordance with one or more embodiments and corresponding disclosure thereof, various aspects are described in connection with a Common Industrial Protocol (CIP) network (e.g., DeviceNet, ControlNet, EtherNet/IP, etc.). According to an embodiment is a system that enables motion control and includes a time synchronization component that provides connectivity with at least one of a CIP network and also includes a timestamp component that interacts with a time sync component. The time synchronization component can provide compensation for step changes that may occur when utilizing motion control systems and methods in order to handle discrepancies caused by various conditions, disruptions, or other factors efficiently.

In accordance with another embodiment of the innovation described herein, the time synchronization component can work in conjunction with a CIP and can employ a timestamp component and a time sync component to determine if a step change has occurred in the system. The time synchronization component can verify that a step change has occurred in the system and can correct for those step changes across the time devices in the system. The time synchronization component can direct a timestamp component to store timestamps and offsets for the various clock nodes in a database. The clocks within the system can be synchronized to a specified uncertainty, so that measurements of any time interval between the clocks are not greater than the specified uncertainties.

In accordance with another embodiment of the innovation described herein, a time synchronization offset clock model can be a network of devices that share the same concept of a system time and each of the devices can also have a local clock value based on frequency disciplined timing and related to system time by a system offset value. For example, the model can allow each device to maintain a local time independence from all of the other devices, but share a common notion of system time associated with a grandmaster clock and as such, system time can change without requiring changes to the local clocks (e.g., microprocessors, embedded controllers, programmable logic controllers (PLC)). The time synchronization offset clock model can define a mechanism to maintain a consistent set of timestamps in the presence of step changes to the grandmaster clock and associated system time. A step change in the system time can effectively cause a shift in the time base of the system and step changes to the grandmaster clock time can be propagated through the system. The step change in the grandmaster clock can occur for various reasons including, power outages, manual reset of the clock, the system loses a satellite signal, and the like.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

BRIEF DESCRIPTION OF THE DRAWINGS

FIG. 5 illustrates a sample table of values for compensation of timestamps within a single node.

FIG. 6 illustrates a sample table of values for compensation for timestamps between different nodes.

DETAILED DESCRIPTION

Figure 1:
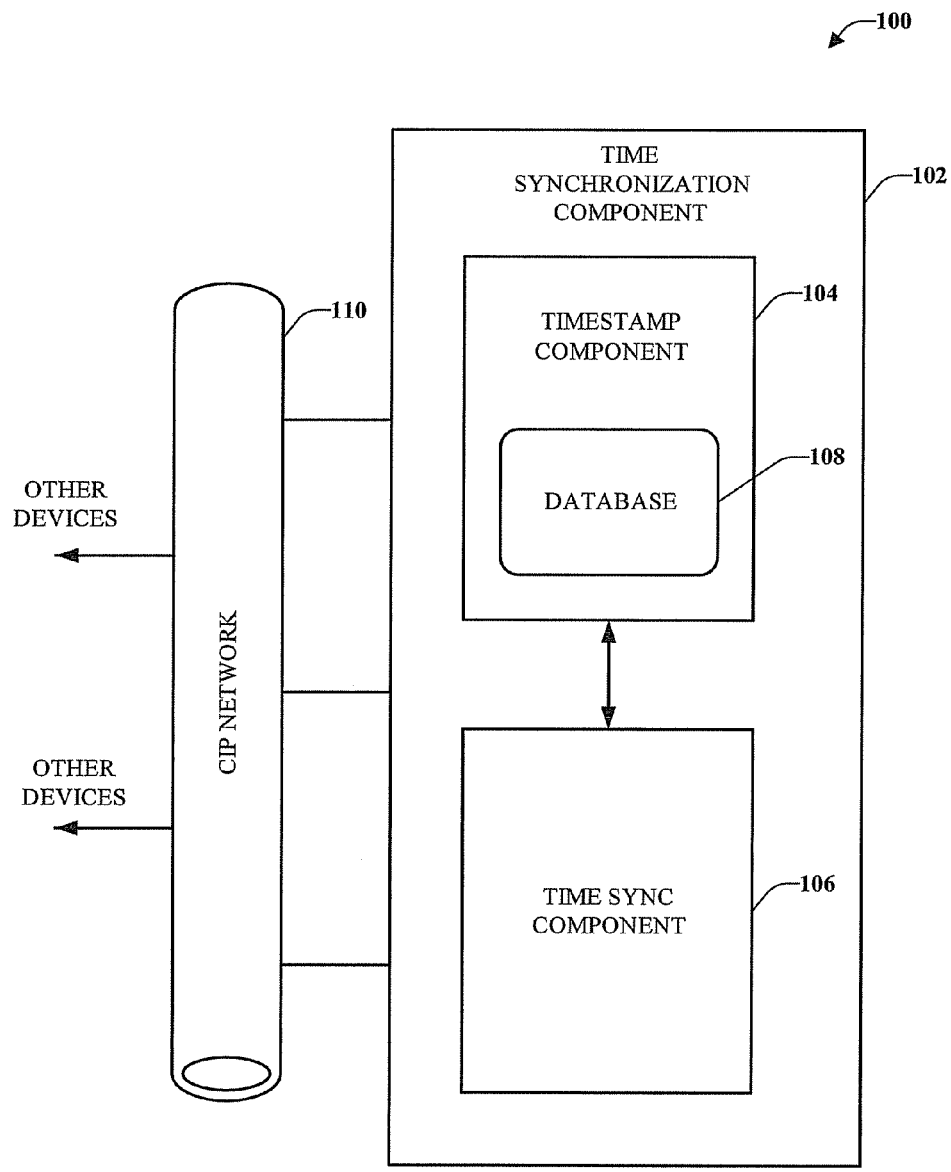
FIG. 1 illustrates a time synchronization system that can compensate for step changes in system time.

Various embodiments are now described with reference to the drawings, wherein like reference numerals are used to refer to like elements throughout. In the following description, for purposes of explanation, numerous specific details are set forth in order to provide a thorough understanding of one or more aspects. It may be evident, however, that various embodiments may be practiced without these specific details. In other instances, well-known structures and devices are shown in block diagram form in order to facilitate describing these embodiments.

As utilized in this application, the terms "component," "system," and the like are intended to refer to a computer-related entity, either hardware, a combination of hardware and software, software, software in execution, and/or firmware. For example, a component can be, but is not limited to being, a process running on a processor, a processor, an object, an executable, a thread of execution, a program, and/or a computer. By way of illustration, both an application running on a server and the server can be a component. One or more components can reside within a process and a component can be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the one or more embodiments may be implemented as a method, apparatus, or article of manufacture using standard programming and/or engineering techniques to produce software, firmware, hardware, or any combination thereof to control a computer to implement the disclosed embodiments. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed embodiments.

Artificial intelligence based systems (e.g., explicitly and/or implicitly trained classifiers) can be employed in connection with performing inference and/or probabilistic determinations and/or statistical-based determinations as described herein. As used herein, the term "inference" refers generally to the process of reasoning about or inferring states of the system, environment, and/or user from a set of observations as captured through events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject embodiments.

Now turning to the figures, FIG. 1 illustrates a time synchronization system 100 that can compensate for step changes in system time. The system 100 can be employed in a motion control system, such as, for example, a manufacturing motion control system within an industrial, automotive, aerospace environment, etc. The time synchronization system 100 can include a time synchronization component 102 that includes a timestamp component 104 that interacts with a time sync component 106. The timestamp component 104 can be configured to record timestamps and offsets captured from at least one network node (e.g., one or more source nodes and/or one or more destination nodes). The time synch component 106 can be configured to identify step changes to at least one master clock and synchronize a local clock time of the network node with the identified step change. Each node maintains a local time independent from other nodes, however, all notes maintain a common understanding of system time. Thus, local clocks can be adjusted to a system time based on the step changes identified by time sync component 106.

The timestamp component 104 can include a database 108 that can be configured to record the changes (if any) in timestamps and offsets of clocks on a common industrial protocol (CIP) network 110. A common industrial protocol can be, for example, DeviceNet, ControlNet, EtherNet/IP, EtherCAT, Profinet, SERCOS, CAN, Precision Time Protocol, Modbus, etc. The clocks or devices (not shown) employed by system 100 can include, for example, a grandmaster clock, master clocks, boundary clocks, ordinary clocks, etc. These various clocks can be, for example, PLC controllers, microprocessors, embedded controllers, programmable automation controllers, switches, I/O devices, standalone GPS, integrated GPS, NTP time keepers, machine clocks, computer clocks, and the like.

The timestamp component 104 and the time sync component 106 can facilitate identifying step changes that have occurred to the overall system time and reconfigure the times of clocks connected to a CIP network 110. A step change can be caused by, for example, losing signal with a satellite, a power outage, "hand setting" or manual setting of the master clock, etc. Timestamp component 104 can make a determination whether a correction is needed and if needed, any offsets can be automatically recorded or maintained in the database 108. Other defined parameters can be stored in database 108 including local clock time(s), system time, one or more system event, fault occurrence(s), grandmaster clock identification, master clock identification, etc. Alternatively or in addition, components and/or programming software within time synchronization component 102 can gather and store data (e.g., clock frequencies, various clock times, the clock designated as the grandmaster clock, etc.) in the database 108 of the timestamp component 104, for example.

By way of illustration and not limitation, the timestamp component 104 and/or database 108 can include nonvolatile and/or volatile memory. Suitable nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

For example, the system 100 can employ an Ethernet/IP CIP network 110 based on standard UDP (User Datagram Protocol), IEEE 1588 (PTP Time Synchronization), Ethernet technology, or the like. The time sync component 106 can determine a system time offset at substantially the same time as the timestamp is captured and the offset can be used to provide an indication of when the step change occurred in the system time. For example, various techniques can be utilized to provide a notification that system time should be manually synchronized or that an automatic synchronization has occurred. Such indication can include, but are not limited to, a visual indication (e.g., flashing light), an audio tone, an e-mail notification, a page, a voice message, etc. In more detail, the timestamp can be transmitted across or through the CIP network 110 from one clock node to a second clock node and the offset, associated with that timestamp, can be sent in conjunction with the timestamp, or at a different time. Two or more timestamps captured at the same node (and associated offsets) can be stored in the database 108 (or in another retrievable format). An algorithm can facilitate a local node adjusting the value of one or more timestamps that have been captured on that local node. It should be understood that while one or more particular algorithm may be discussed in reference to the disclosed embodiments, various algorithms, methods, and/or techniques can be employed to compensate for step changes in system time.

Additionally or alternatively, a destination node can detect a step change to the system time on a remote node and can make any necessary time adjustments. It is to be appreciated and understood that the timestamp component 104 and/or the time sync component 106 can make use of various communication paths to obtain timestamps and offsets. Such communications paths can be but are not limited to the Internet, hard-wire networks, wireless networks, local area network (LAN), wide area network (WAN), Ethernet or other communication paths. It is also to be understood and appreciated that the term system as used herein can refer to motion control systems, a machine, equipment, measurement systems, test systems, a manufacturing cell, an assembly line, several machines integrated together, and the like. Further, the system 100 can utilize, for example, American Inter Range Instrumentation Group (IRIG-B), Network Time Protocol (NTB), Telecommunications Working Group (TCWG), Global Positioning System (GPS), Precision Time Protocol (PTP) and Flooding Time Synchronization Protocol (FTSP), etc.

It is to be appreciated that the subject embodiment as well as other embodiments described herein can optionally employ various artificial intelligence based schemes for automatically carrying out various automated functionality described herein. Accordingly, any suitable component or act discussed herein can optionally employ artificial intelligence (AI) in connection with facilitation of carrying out a subset of functionality associated therewith. For example, inferring whether a step change is likely to occur to system time during a manufacturing operation or time of year and solutions therefore to be implemented can be facilitated by an automatic process.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed (e.g., recording an event). In the case of timestamps, offsets and events for example, attributes can be file types or other data-specific attributes derived from the file types and/or contents, and the classes can be categories or areas of interest.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, and probabilistic classification models providing different patterns of independence can be employed. Classification as used herein also is inclusive of statistical regression that is employed to develop models of priority.

As will be readily appreciated from the subject specification, classifiers can be employed that are explicitly trained (e.g., by a generic training data) as well as implicitly trained (e.g., by observing user behavior, receiving extrinsic information). For example, SVM's can be configured through a learning or training phase within a classifier constructor and feature selection module. In other words, the use of expert systems, fuzzy logic, support vector machines, greedy search algorithms, rule-based systems, Bayesian models (e.g., Bayesian networks), neural networks, other non-linear training techniques, data fusion, utility-based analytical systems, systems employing Bayesian models, etc. are contemplated and are intended to fall within the scope of the hereto appended claims.

Other implementations of AI could include alternative embodiments whereby based upon a learned or predicted user intention, the system can prompt users to update device clocks with the most degraded performance, based on data with the database 108 of the time synchronization component 102. Likewise, an optional AI component can remove clock timestamp and offset data to increase the amount of memory in the database 108 or other storage medium. The data to be removed from the database 108 can be determined by the AI component without human interaction.

Figure 2:
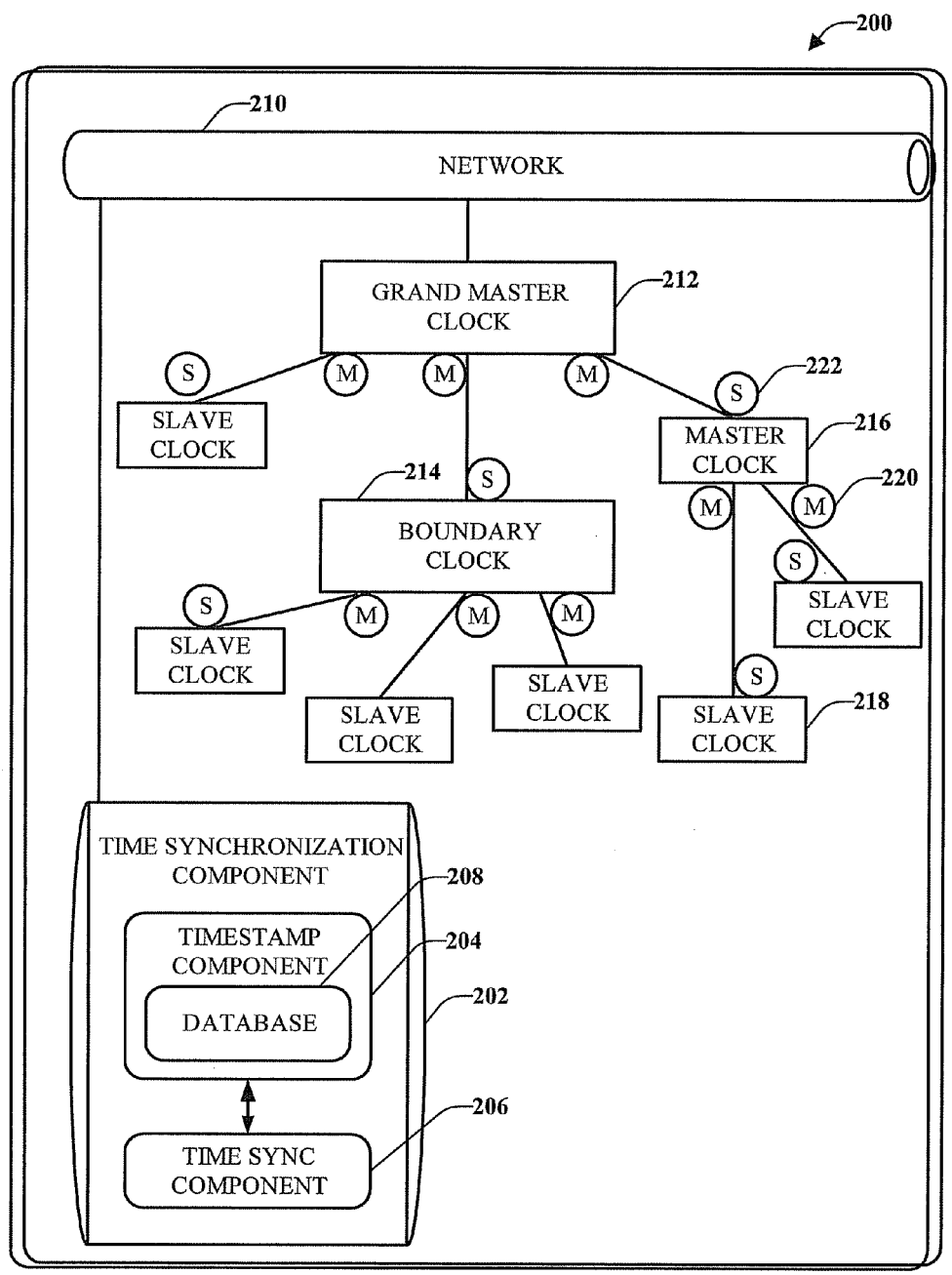
FIG. 2 illustrates a time synchronization system in accordance with one or more embodiment.

Referring now to FIG. 2, a time synchronization system 200 that can be employed in connection with one or more manufacturing systems is illustrated. The time synchronization system 200 can include a time synchronization component 202. The time synchronization component 202 can operate in conjunction with a network industrial protocol to accurately represent time by detecting step changes in system time and, to distribute accurate time across a network 210, correct for those step changes. The system 200 can include anywhere from a single machine to a complex manufacturing line with multiple machines integrated together.

The time synchronization component 202 can include a timestamp component 204 that interfaces with a time sync component 206. A database 208 or other storage media can be included in timestamp component 204 or another system component. Time synchronization component 202 can direct timestamp component 204 and a time sync component 206 to store both timestamps and time offsets for various clock nodes in a database 208. For instance, at a first point in time the timestamp component 204 can determine a timestamp set across a network 210 and can communicate the timestamp and associated time offset to the database 208. At a second point in time the time sync component 206 can employ an algorithm (or multiple algorithms) or other techniques to determine if the offset warrants a step change compensation in the system time. If necessary, the timestamp component 204 can communicate or interface with the time sync component 206 and notify the time synchronization component 202 to change the system time.

According to some embodiments, any changes to the system time can be recorded in the database 208. Thus, it is understood that the database 208 can store data related to system time and/or other time related data (e.g., time offsets, clock frequencies, timestamps, sequence of events, detected fault times, distributed motion control events, etc.). For instance, the database 208 can be downloaded or backed up on a regular basis to ensure ready access to the time correlated data. Furthermore, while for ease of explanation the database 208 is described as recording all of the changes to the time synchronization system 200, any suitable combination of recording data is contemplated and intended to fall under the scope of this detailed description.

The time synchronization system 200 can be associated with a manufacturing system time synchronization protocol to facilitate synchronization on the network 210 (e.g., a LAN such as Ethernet, ARCNET, Token Ring, Fiber Distributed Data Interface (FDDI), and the like). Examples of time synchronization protocols include, but are not limited to, IEEE 1588—Precision Clock Synchronization Protocol for Networked Measurement and Control Systems, Flooding Time Synchronization Protocol (FTSP), Network Time Protocol (NTP), etc.).

System 200 can include various clocks, such as a collection of IEEE 1588 clocks. For example, a grandmaster clock 212 (e.g., a switch with grandmaster clock functions), can be employed to temporarily serve as the primary source of time to which all other clocks in the system are ultimately synchronized. The system 200 can be segmented into regions separated by a boundary clock 214. A boundary clock can be a clock with more than a single PTP port, wherein each PTP port provides access to a separate PTP communication path and can be utilized to mitigate fluctuations produced by routers and similar network devices. Within a region, the system 200 can employ one or more devices capable of becoming a master clock 216 (e.g., PLC controllers, standalone and integrated GPS or NTP time keepers, . . . ), slave clocks 218 (i.e., I/O devices), and other devices that may or may not support time synchronization (switches, I/O, etc.). The master clock 216, can be synchronized to other master clocks (not shown), within other regions and ultimately to the grandmaster clock 212.

A boundary clock 214 (e.g., a clock within a tool) can be a clock having more than one PTP port, with each PTP port providing access to a separate PTP communication path and each PTP port can be either a master port 220 or a slave port 222. Boundary clocks 214 can be configured to eliminate fluctuations produced by routers and similar network elements. In accordance with some embodiments, a boundary clock 214 can be a device providing a measurement of the passage of time since the defined epoch, which is a reference time that can define the origin of the time scale in terms of its value. The epoch is an arbitrary fixed date, utilized in computing the actual time within the system (i.e., epoch for PTP—Jan. 1, 1970.).

The various clocks within the system 200 can be synchronized to a specified uncertainty, and have the same epoch so that measurements of any time interval between the clocks differ by no more than the specified uncertainties. In this way, the timestamps generated by any two synchronized clocks for the same event should differ by no more than the specified uncertainty. System time can be defined as the absolute time value as defined by the time synchronization system 200 in the context of a distributed time system where all of the devices can have a local clock that can be synchronized with a common master clock.

System time can be, for example, a 64 bit integer value in units of nanoseconds or microseconds with the value of zero, corresponding to an epoch that can be defined as, Jan. 1, 1970. As suggested above, one or more clocks can serve as the grandmaster clock 212 at a given time, however, any suitable clocks or clock combinations are contemplated and can be located at various locations within the system 200 to synchronize system time and all such alterations are intended to fall under the scope of this detailed disclosure.

The IEEE standard 1588 or more commonly known as Precision Time Protocol (PTP) specifies a protocol that can synchronize independent clocks running on separate nodes of a distributed measurement and control system to a high degree of accuracy and precision. The clocks can communicate with each other over a communication network and in its basic form, the protocol is intended to be administration free. All clocks can ultimately derive their time from the clock, known as the grandmaster clock 212. The communication path between any clock and the grandmaster clock 212 can be part of a minimum spanning tree (MST), calculated by employing a MST algorithm within the time synchronization component 202 used to find a near-optimal path between clocks for synchronization.

The starting date/time of the system 200 can be any reference time. For example, the starting date/time can be 12:00 a.m., Jan. 1, 1970, and can be represented as a 64-bit value in nanoseconds, microseconds, or another fraction of time. System time can be adjusted by the time synchronization component 202 for leap seconds, but might not be adjusted for local time zones or daylight savings time. System time can represent the current time at the $0^{th}$ meridian.

In the Precision Time Protocol, time can be distributed as a structure of type "TimeRepresentation" and this structure can be made up of two 32-bit elements. The first element of the structure can represent the number of seconds since the beginning of the epoch (e.g., Jan. 1, 1970). The second element in this structure represents the number of nanoseconds. Leap seconds can be distributed by a Precision Time Protocol (PTP) as the current_utc_offset field. PTP time and leap seconds can be converted to microseconds or nanoseconds to give System Time as:

$$SystemTime = PTPTime - LeapSeconds$$

Each node on the CIP network 210 configured for clock synchronization can contain an implementation of a PTP clock as well as an implementation of the PTP software protocol stack. The choice of whether to implement a hardware assist clock or software clock can depend on cost and accuracy considerations. The hardware assist circuit will generally result in a more accurate clock, usually in the sub-microsecond range, while a software implemented clock will yield accuracy, in the tens of microseconds range. The PTP protocol stack implementation contains the software that implements the protocol, and this includes the messaging between clocks to synchronize slave clocks to master clocks, the algorithms to process message timestamps and tune the clock frequency, and the management of message support required for clock administration.

Figure 3:
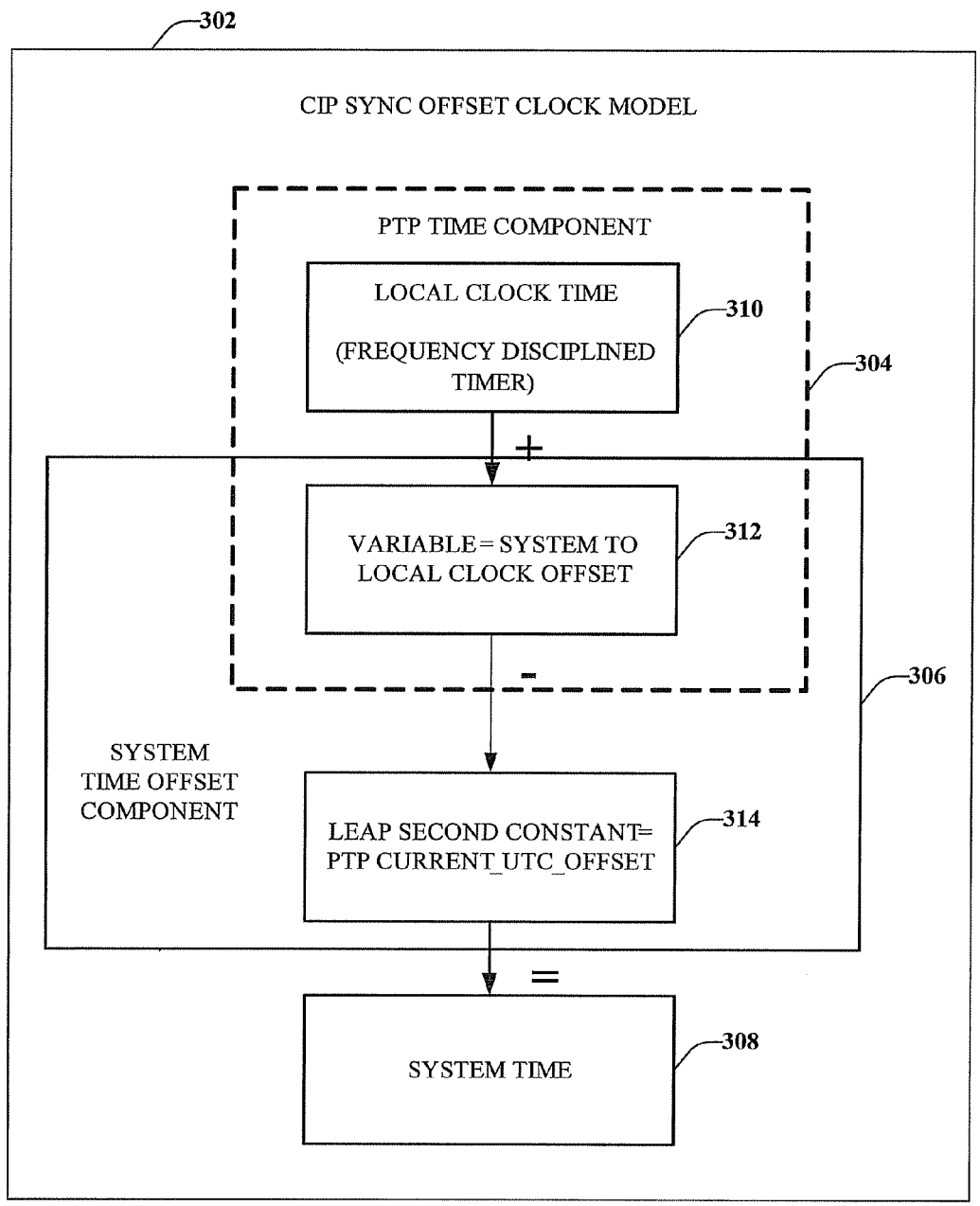
FIG. 3 illustrates an exemplary time synchronization offset clock model in accordance with an aspect of the various embodiments.

Now referring to FIG. 3, illustrated is an exemplary time synchronization offset clock model 302 in accordance with an aspect of the various embodiments. The offset clock model 302 can be employed in an industrial motion control and manufacturing environment, for example. CIP system offset clock model 302, can include a PTP time component 304 and a system time offset component 306, that in conjunction arrive at a system time 308. The offset clock model 302 can show the relationship between a local clock 310 (frequency disciplined timer), a variable 312 (system to local clock time offset), a leap second constant 314 and the system time 308 for the PTP time slave ordinary clock. The system time 308 to the local clock 310 offset can be a memory variable maintained by the PTP clock implementation to make offset adjustments. The leap second constant 314 can be subtracted from the offset to give the system time 308, in terms of the proper epoch. The PTP timing is the local clock 318 (frequency discipline timer) plus a variable 312, which is equal to the system to local clock offset. The system time offset component 306 can calculate the system time offset that can equal the variable 312, the leap second constant 314 can equal PTP Current_UTC_Offset.

Figure 4:
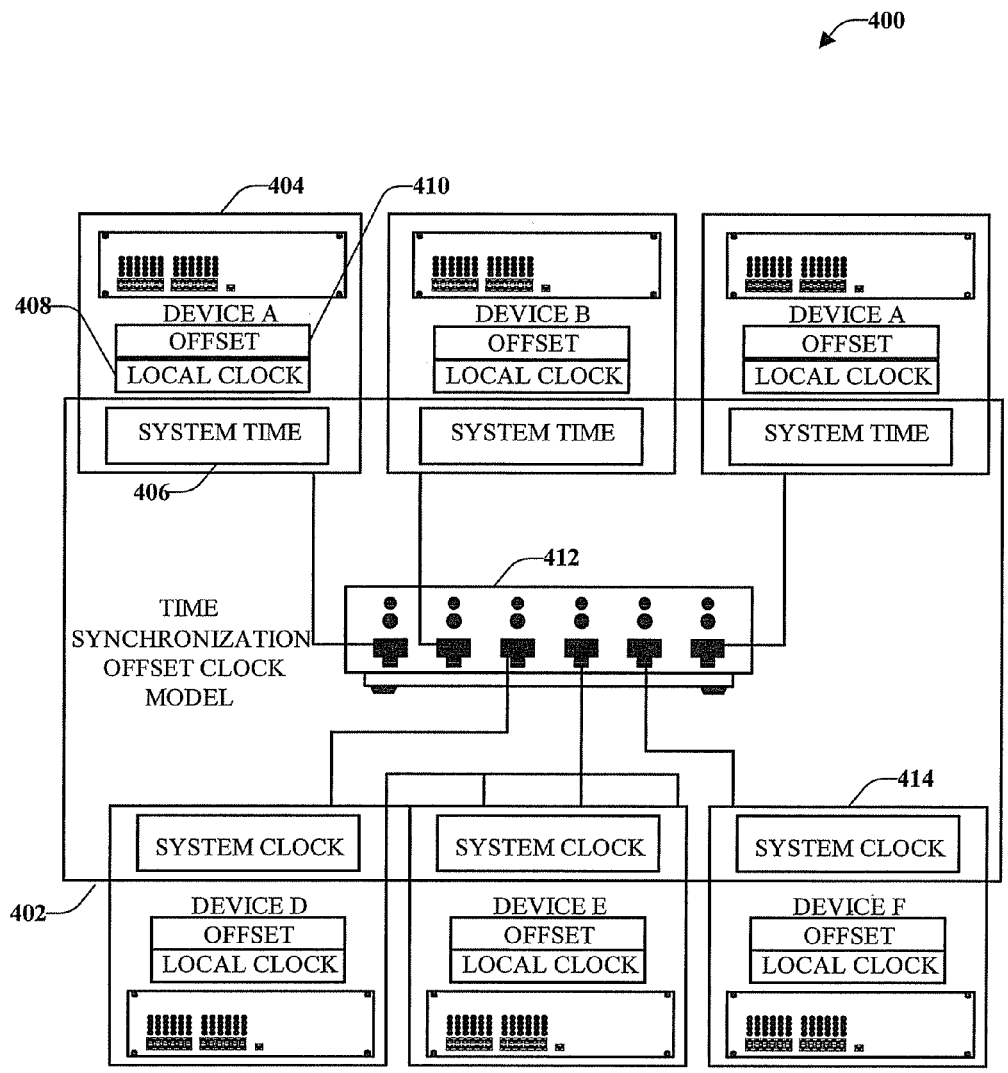
FIG. 4 illustrates a system of devices, each configured to implement in a CIP sync offset clock model.

FIG. 4 illustrates a system 400 of devices, each configured to implement in a CIP sync offset clock model 402. A device 404 can be part of a network of devices that share the same concept of a system time 406 and each of the devices can also maintain local time maintained on a local clock 408 based on frequency disciplined timing and related to system time through an offset value 410 (system time offset). Such a system can allow each device to maintain a local time independence from all of the other devices, but share a common notion of system time associated with a grandmaster clock 412 and as such, system time can change without requiring changes to the local clock. The CIP sync offset clock model 402 can define a mechanism to maintain a consistent set of timestamps in the presence of step changes to the grandmaster clock 412 and associated system time 406. A step change in the system time effectively causes a shift in the time base of the system 400 and step changes to the grandmaster clock 412 time can be propagated through the system 400. Since all nodes in the system 400 might not see the step change at the same time, a timestamp can be taken on one node that can be inconsistent with the timestamp taken on another node. Also, a timestamp taken in one instance in time may be inconsistent with the timestamp taken later in time on the same node. Compensation algorithms can make timestamps consistent with each other before they are used in computations to change the local time to system time. The decision to compensate timestamps can be made or based on the specific requirements of the application.

Two or more algorithms can be used to make the timestamps consistent and the decision to compensate the timestamps can be made based on the requirements of the specific application. In the single node algorithm (Compensation Algorithm for Timestamps within a Single Node), the single node algorithm can be defined to allow a node to adjust the value of one or more timestamps that have been captured on the local node. In system 400, timestamps that are captured on node or device A 404 can be compared with offsets and the selected time base to determine if compensation is required, this will be discussed further below. In the multiple node algorithm (Compensation Algorithm for Timestamps between Nodes) the multiple node algorithm can be defined to allow a destination node to adjust the value of a received timestamp from a source node so that it can be compared to a timestamp on the destination node. In system 400, timestamps that are captured on the destination node or a device F 414 can be compared with timestamps that are sent from the source node or device A 404 to determine if compensation is required, as discussed below. The time synchronization component can also provide a group startup sequence that allows the group of devices to ensure that their clocks have all been synchronized to the master clock before starting an application that depends on the system time.

FIG. 5 illustrates an example of a sample table of values for compensation of timestamps within a single first node. The algorithm (Compensation Algorithm for Timestamps within a Single Node) can be employed to compensate for timestamps received at the single first node after a system step change to allow the single first node to adjust the value of one or more timestamps that have been captured on the single first node. The subject innovation can employ the following equation:

$$\text{Timestamp}_{(C)} = \text{Timestamp}_{(O)} + \text{Offset}_{(1)} - \text{Offset}_{(O)}$$

where, $\text{Timestamp}_{(C)}$=compensated timestamp, $\text{Timestamp}_{(O)}$=timestamp requiring compensation, $\text{Offset}_{(1)}$=offset associated with the timestamp at the target time base, and $\text{Offset}_{(O)}$=offset for the timestamp to be compensated As such, in this example embodiment, at the index value T0, the master time is 100, the time base is 100, the timestamp is 100, and the time offset is 0. At the index T1, the master time is 200, the timestamp is 200 and again the offset is 0. Applying the above equation for T2, comparing the timestamps (in seconds, at the single first node) at index T1 and T2 can be written in abbreviated form $$\text{Timestamp}_{(T1)} = \text{Timestamp}_{(T1)} + \text{Offset}_{(T2)} - \text{Offset}_{(T1)}$$

and $$\text{Timestamp}_{(T1)} = 200 + 1000 - 0$$

The $\text{Offset}_{(T2)}$ is 1000 because the anticipated master time at T2 is 300, however the time is 1300 and therefore the offset is 1000 and the timestamp becomes 300+1000=1300 and the master time and the timestamp are synchronized. As suggested above, one clock node can be synchronized with the master clock, however, any suitable clocks or clock combinations are contemplated and can be synchronized within the system and are intended to fall under the scope of the hereto-appended claims.

FIG. 6 illustrates an example of a sample table of values for compensation for timestamps between different nodes. The multiple node algorithm (Compensation Algorithm for Timestamps between Nodes) can allow for a destination node 604 to adjust the value a received timestamp from a source node 602 that can be compared to a timestamp on its own node, the destination node. At least two conditions can be possible: the source device has seen a step change in time but the destination device has not, or the destination device has seen a step change in time but the source device has not. The step change can be detected by a change in the system time offset by either the source node 602 or the destination node 604. The source offset can be sent to the destination node 604 along with a timestamp. The destination device can compare the offset received to the previously received offset to determine if a step change has occurred, and can selectively adjust the received timestamp value accordingly. The multiple node algorithm, can be stated as follows:

$$\text{Timestamp}_{Compensated} = \text{Timestamp}_{Received} + ((Dest_{Offset} - Dest_{LastOffset}) - (Source_{Offset} - Source_{LastOffset}))$$

where, $\text{Timestamp}_{Received}$ can be the received timestamp.

$Dest_{Offset}$ can be the current value of the local clock time offset at the destination.

$Dest_{LastOffset}$ can be the previous value of the local clock time offset at the destination.

$Source_{Offset}$ can be the received value of the local clock time offset from the source.

$Source_{LastOffset}$ can be the previous value of the local clock time offset from the source.

Last offsets can be updated when:

$$|(Dest_{Offset} - Dest_{LastOffset}) - (Source_{Offset} - Source_{LastOffset})| \leq \text{SyncBoundsLimit}$$

where,

SyncBoundsLimit can be a relatively small number ($\leq 1000$) that defines the synchronization bounds for the application.

With continuing reference to FIG. 6 an example of a sample table comparing two timestamps communicated between disparate nodes after a system step change has occurred will be briefly described. A data packet can be sent at the sync interval with a communication or propagation delay between nodes assumed to be zero, the offsets can be arbitrarily assumed to be the same and initially can be zero, and the SyncBoundsLimit can be assumed a number less than or equal to 1000. At interval T3, a first step change of 1000 occurs in the master clock and can be seen by the source node clock 602, however it may not be seen at the destination node clock 604. At interval T4, the destination node clock 604 sees the step change in the master clock, but no adjustment are made to timestamp, because the source and destination compensations (offsets) cancel out. After interval T4, the last offset values can be adjusted as shown in interval T5.

Figure 7:
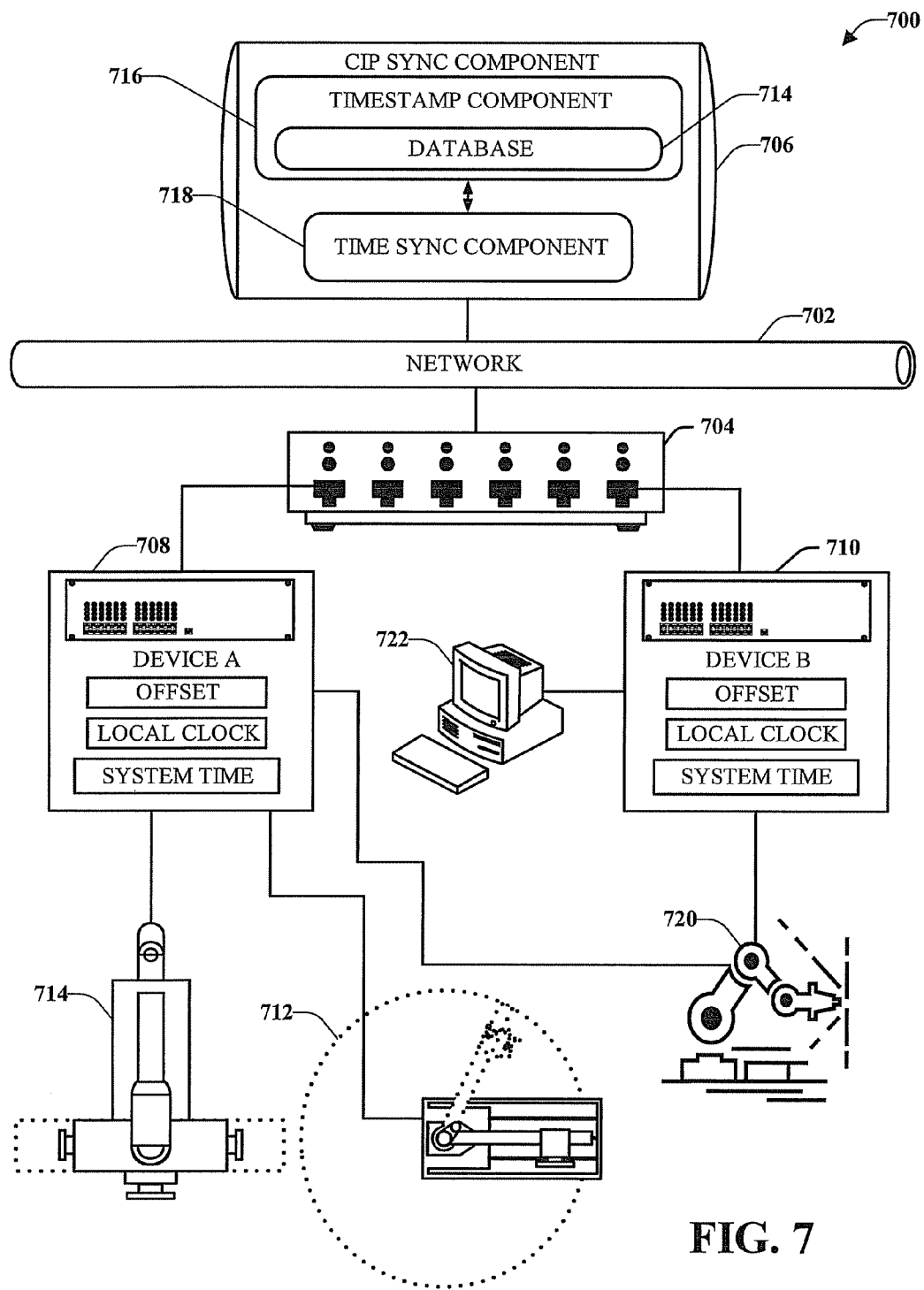
FIG. 7 illustrates an exemplary system employing the one or more embodiments disclosed herein.

Turning to FIG. 7, illustrated is an exemplary system 700 employing the one or more embodiments disclosed herein in an industrial automation environment. It should be appreciated that system 700 is provided to facilitate understanding of aspects of the various embodiments and not to limit the scope thereof. System 700 can include a communication path or network 702 (e.g., hard-wire networks, wireless networks, local area network (LAN), wide area network (WAN), DeviceNet, ControlNet, Ethernet, EtherNet/IP, EtherCAT, Profinet, SERCOS, CAN, Precision Time Protocol, Modbus, CANopen, ARCNET, Token Ring, FDDI, etc.). System 700 can also include a switch 704 acting as a grandmaster clock such as a programmable logic controller (PLC) or other control system, for example. The switch 704 interacts with a time synchronization component 706 and can also interact with a plurality of clocks, e.g., device A 708 and device B 710. Device A 708 can communicate and provide system time for automation devices including a drilling machine 712, vertical mill 714 and a robotic welding cell 720 containing multiple robots. The time synchronization component 706 can receive data from the switch 704 and store such data to a database 714 utilizing a timestamp component 716 in association with a time sync component 718. For instance, the timestamp component 716 can collect timestamp and offset time data and employ algorithms to adjust the system time of various devices so that the associated clocks are synchronized with the switch 704 (grandmaster clock). Additionally, the switch 704 can retrieve data from the database 714 through network 702, and provide such data to various clocks within the system 700 to enable clock synchronization, for example.

Device B 710 in FIG. 7 can interface with the switch 704, the robotic welding cell 720, and a computer 722. The robotic welding cell 720 can be a tandem welding system that can control one or more coordinated actions between the multiple welding units. For example, this can include synchronized welding operations such that the welding units are started and stopped in a coordinated manner to facilitate an overall welding process in a manufacturing operation. As an example of this process, synchronous instructions can be issued by the computer 722 and/or over the network 702 by a PLC controller (not shown) such that the welders within the robotic welding cell 720 operate in a coordinated manner. This can include one welder performing a portion of the process with the other welder performing other portions of the process. Other actions can include controlling several welders such that similar portions of a work piece, for example, are concurrently welded at similar locations. One possible technique to perform coordinated welding is to supply the welders with a master clock reference (not shown) (e.g., externally supplied and/or derived from a clock supplied on the network 702) such that as the welders are given control commands, the welders perform these commands at a predetermined time. Thus, operations and commands can then be coordinated with the clock in a substantially synchronous manner. Other types of commands can include adjustable time delay commands for starting and stopping a weld cycle, trigger commands for on/off timing (e.g., on at same time), sending suitable output command levels per respective welder to achieve desired weld profile (e.g., a first welder intermittent, a second welder continuous). In this example, the robots are provided with local time from both device A 708 and device B 710 and therefore if the switch 704 (grandmaster clock) experiences a step change the local clocks, devices A and B (708 and 710) can detect the step change and adjust the timestamps and offsets to re-synchronize to system time or can remain on local time and can thus continue coordinated operations.

Figure 8:
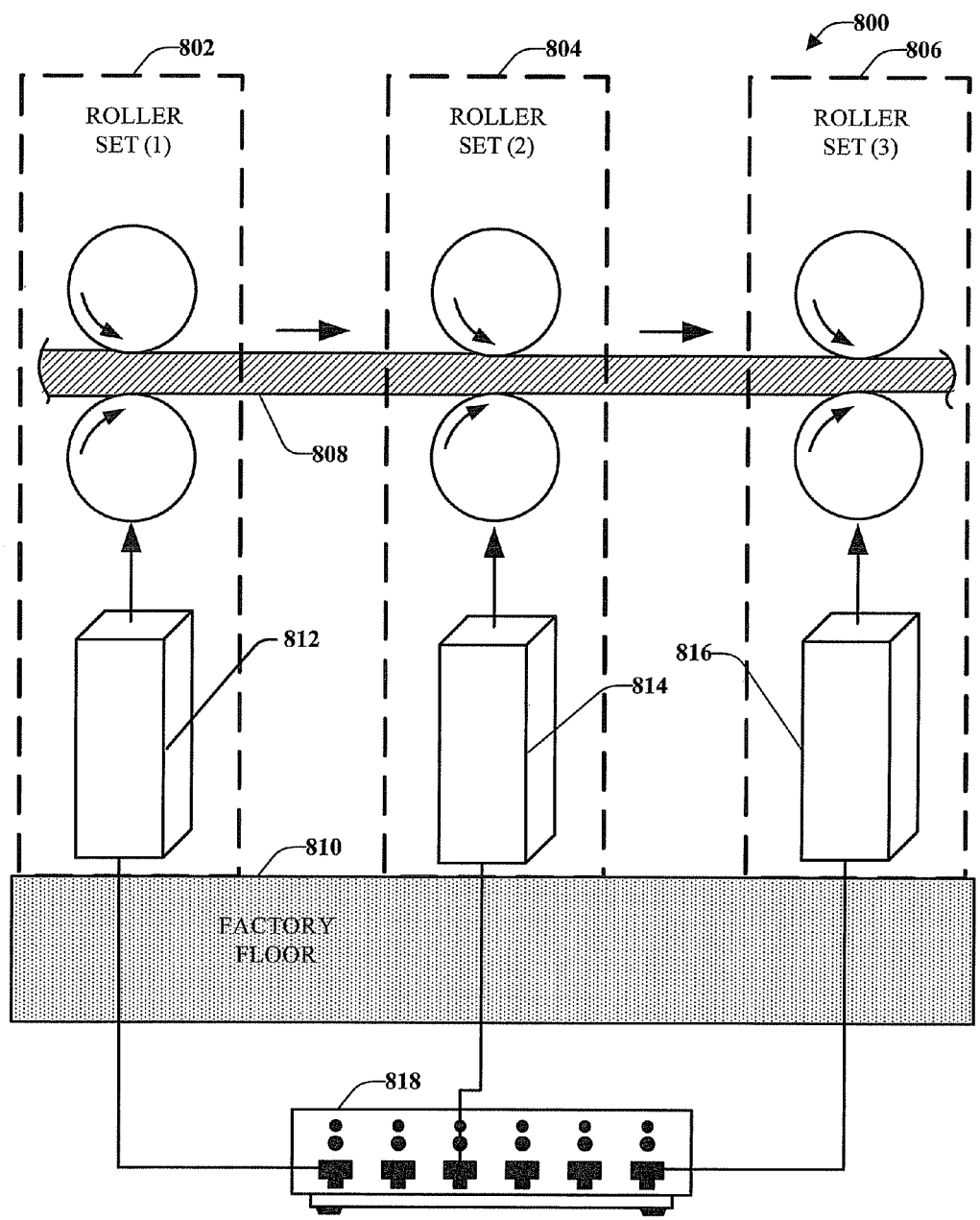
FIG. 8 illustrates a motion control system in accordance with the various disclosed embodiments.

FIG. 8 illustrates a distributed high-precision motion control system 800 in accordance with the various disclosed embodiments. System 800 includes roller set (1) 802, roller set (2) 804 and roller set (3) 806 that work in unison to create sheet steel 808. Each of the roller sets can be driven by an individual motor (not shown) and each roller set can be compressing the steel 808 in order to form sheet metal, e.g., for automotive panels and the like. According to this embodiment, motion controller (1) 812, motion controller (2) 814, and motion controller (3) 816 can control the position and speed of the rollers over time so that the roller set (1) 802, roller set (2) 804, and roller set (3) 806 can work in unison when rolling out the sheet steel 808. Hence, one or more roller sets can communicate with the motion controllers through interface switch 818 (grandmaster clock). The interface switch 818 can receive communications from the motion controller (1) 812, motion controller (2) 814, and motion controller (3) 816, for example utilizing TCP/IP or UDP data packets, reliable messages such as MSMQ, MQTT, MQ, JMS, by remote method invocation (RMI), by inter-process communication, web services, etc. The system 800 may use peer to peer connection, control to drive connections, and the like for distributed motion control.

For example, as the steel 808 is compressed at the various roller sets the linear motion of the steel increases and the roller set (3) 806 can be rotating more rapidly than the roller set (1) 802. Historically this was controlled by a mechanical line shaft where a single mechanical shaft drives multiple subsystems using belts, pulleys or gear boxes. However, mechanical lines shafts can, for example, be inflexible, require long product change outs, run-time adjustments for re-phasing were non-existent or required expensive differential gear-boxes, result in extensive wear and tear of mechanical components, etc. These mechanical designs have given way to electronic design control systems, for example the position and velocity of the roller set (1) 802 can be controlled electronically employing the controller 812 and the switch 818 (grandmaster clock). The time synchronization component (not shown) can identify step changes in the switch 818 and compensate for those step changes by employing algorithms within the time synchronization component to calculate system time based on timestamps and offsets. The system 800 innovation can avoid many of the problems associated with step changes in a electronic gearing application, e.g., loss of quality in the product, undue loads and stresses on the mechanical equipment, high motor currents and therefore premature failure, etc.

Figure 9:
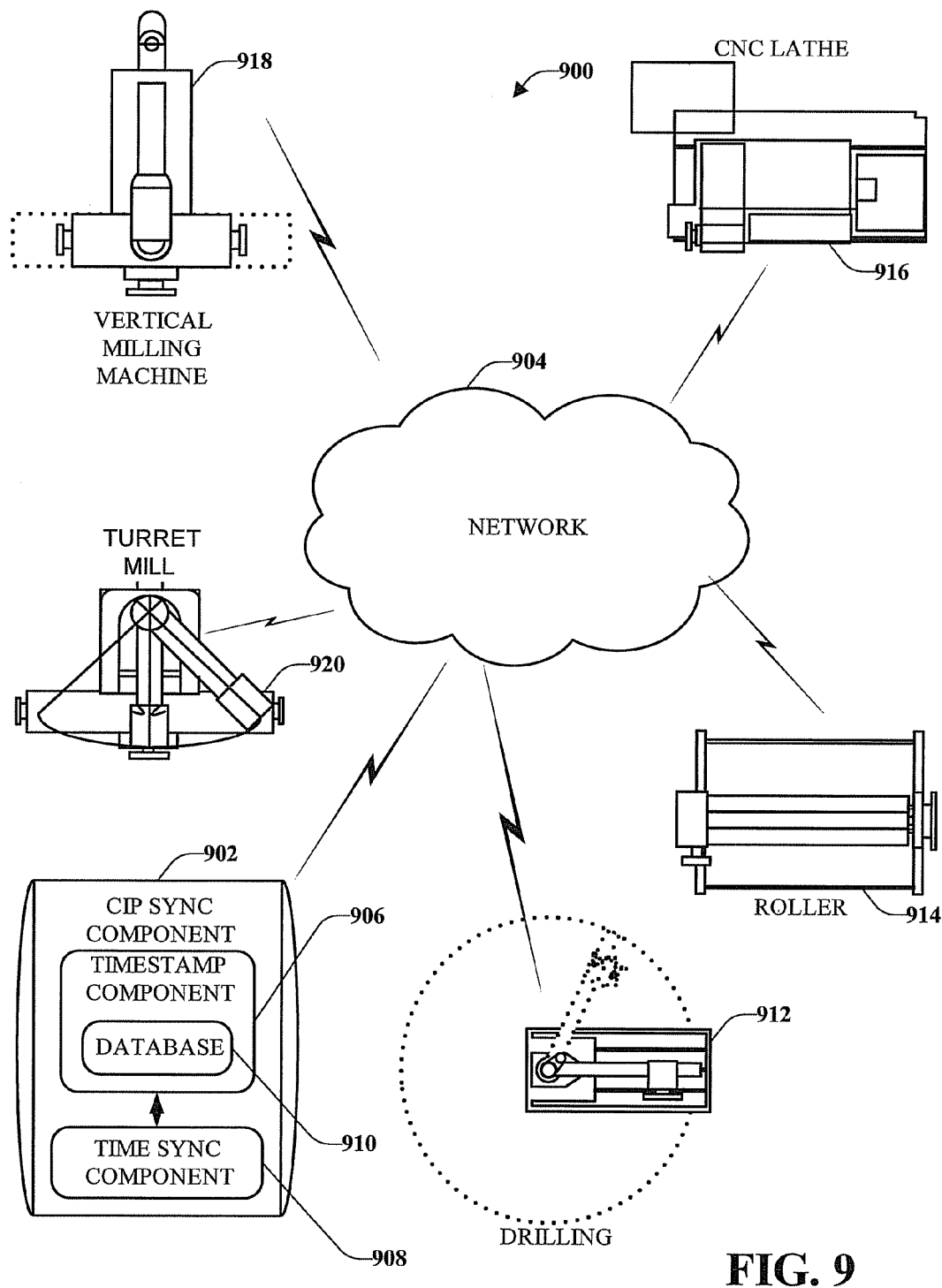
FIG. 9 illustrates an exemplary system that can facilitate generating a wireless master-slave relationship among various clocks.

FIG. 9 illustrates an exemplary system 900 that can facilitate generating a wireless master-slave relationship among various clocks. The various clocks can be associated with, for example, PLC controllers, clocks within various machines, etc. According to one aspect, a system 900 that can be employed in connection with one or more manufacturing systems is illustrated. The system 900 can employ a time synchronization component 902 that can wirelessly communicate utilizing a network industrial protocol to accurately represent time by detecting step changes in the system 900 time and correct the step changes to distribute accurate time wirelessly to a network 904 of a manufacturing system. The manufacturing system can range from a single machine to a complex manufacturing line with multiple machines integrated together. The time synchronization component 902 can be employed to wirelessly direct a timestamp component 906 and a time sync component 908 to store both timestamps and time offsets for the various nodes in a database 910. For instance, at a first point in time the timestamp component 906 can wirelessly send a timestamp to a network 904 and can communicate the timestamp and associated time offset to the database 910. At a second point in time the time sync component 908 can employ an algorithm to determine if the time offset warrants step change compensation. If necessary the timestamp component 906 can communicate with the time sync component 908 notifying the time synchronization component 902, wirelessly, to change the system time of the manufacturing system and any changes to the system time can be recorded in the database 910. Thus, it is understood that the database 910 can store data related to system time and other time related data, e.g., time offsets, clock frequencies, timestamps, sequence of events, detected fault timing, distributed motion control, etc.

The time synchronization component 902 can also communicate wirelessly with the various machines including a drilling machine 912, a roller 914, a CNC lathe 916, a vertical milling machine 918 and a turret mill 920. All of these machines can contain clocks that can communicate wirelessly. For example, one of the clocks within the machines in the system 900 can be selected as the master clock based on various criteria, such as examining information contained in synchronization messages exchanged by the different clocks, as well as other parameters.

Figure 10:
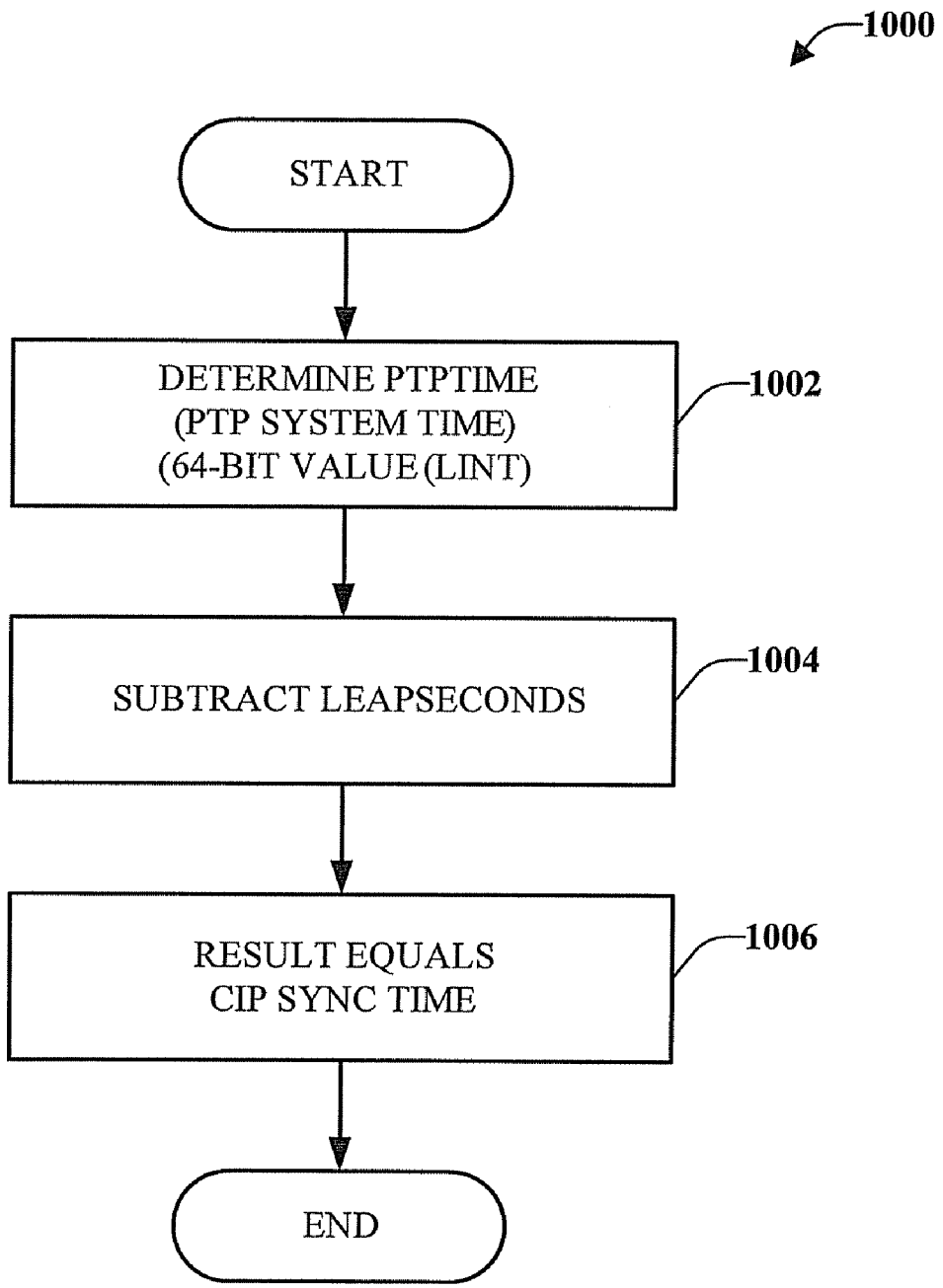
FIG. 10 illustrates a methodology for determining a CIP sync time based upon knowing a PTP time.
Figure 11:
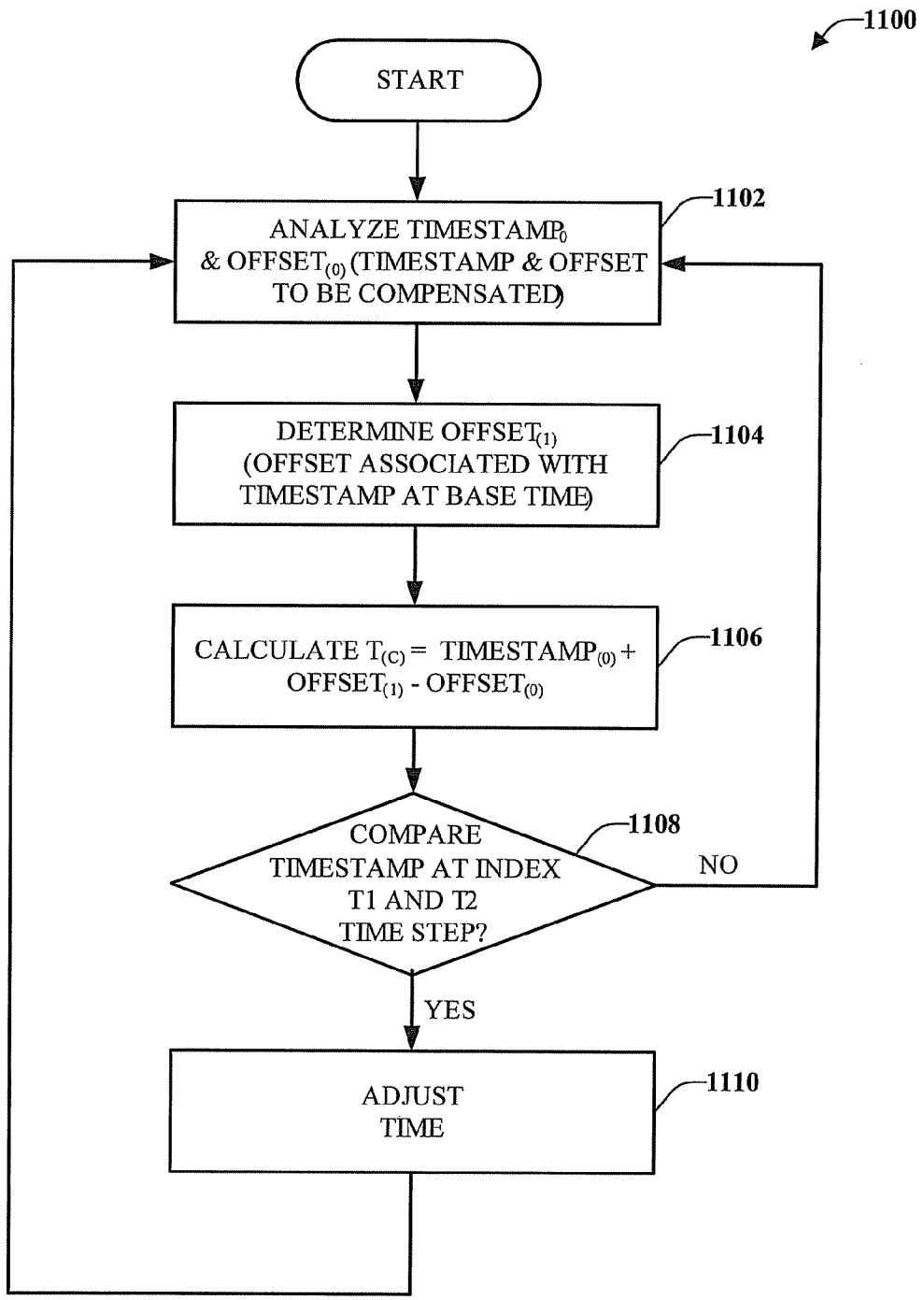
FIG. 11 illustrates a methodology for sampling and analyzing various data in accordance with one or more embodiment.
Figure 12:
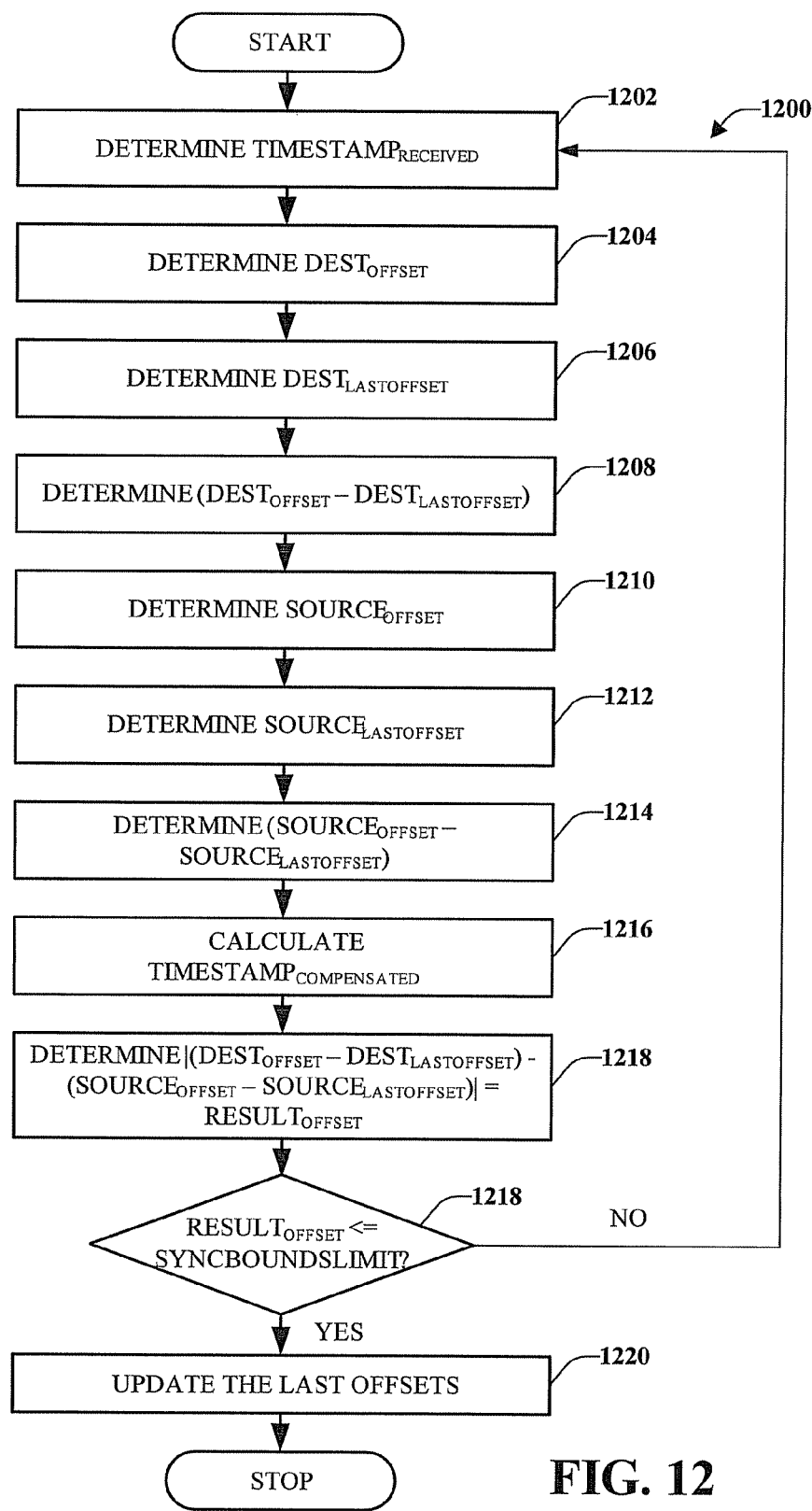
FIG. 12 illustrates another methodology for sampling and analyzing various data in accordance with some embodiments disclosed herein.

FIGS. 10-12 illustrate methodologies in accordance with various embodiments of the claimed subject matter. While, for purposes of simplicity of explanation, the methodologies are shown and described as a series of blocks, it is to be understood and appreciated that the claimed subject matter is not limited by the order of blocks, as some blocks may occur in different orders and/or concurrently with other blocks from that shown and described herein. For example, those skilled in the art will understand and appreciate that a methodology could alternatively be represented as a series of interrelated states or events, such as in a state diagram. Moreover, not all illustrated blocks may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 10 illustrates a methodology 1000 for determining a CIP sync time based upon knowing a PTP time. The method starts at 1002 where a PTP time is determined. At 1004, a correction for leap seconds is subtracted to the time because our current civil time is based on coordinated universal time (UTC) and leaps seconds are used to guarantee that UTC does not differ from the earth's rotation by more than 0.9 seconds. When a leap second adjustment is made it can be captured by the system. At 1008 the CIP sync time can be utilized by the system.

FIG. 11 illustrates a methodology 1100 for sampling and analyzing various data in accordance with one or more embodiment. An algorithm can be employed to compensate for timestamps received at a single node after a system step change has occurred at the node to adjust the value of one or more timestamps that have been captured on that local node. At 1102, a Timestamp$_{(0)}$ (timestamp requiring compensation) and an Offset$_{(0)}$ (offset for the timestamp to be compensated) can be obtained and analyzed. The Timestamp$_{(0)}$ and the Offset$_{(0)}$ (e.g., first timestamp and associated offset) can be information gathered by the CIP sync component and stored within the database. A second offset associated with a second timestamp at the target time base (Offset$_{(1)}$) can be determined at 1104. At 1106, a Timestamp$_{(C)}$ (compensated timestamp) can be calculated based on the first time stamp and associated offset and the second time stamp and associated offset. At 1108, Timestamp$_{(C)}$ and Timestamp$_{(C+1)}$ can be compared to determine if a step change has occurred. A step change has occurred if the sum of Timestamp$_{(C)}$ minus Timestamp$_{(C+1)}$ is more than the time base. If a step change has not occurred the process is repeated starting at 1102. If a step change has occurred at 1108, the method continues at 1110 where the system time is selectively adjusted to compensate for the new timestamp and offset. The time related data can be stored based on content, the size of the data, relevance of the data to the company's expected needs, priority of the data, cost of the data, likelihood of future use, utility of the data, etc.

FIG. 12 illustrates a methodology 1200 of sampling and analyzing various data in accordance with some embodiments disclosed herein. An algorithm can allow a destination node to adjust the value of a received timestamp from a source node that can have a timestamp on its own node. At least two conditions can be possible: the source node or device has seen a step change in time but the destination node or device has not, or the destination node has seen a step change in time but the source node has not. The step change can be detected by a change in the system offset by either the source node or destination node. The source offset can be sent to the destination node along with the timestamp and the destination device compares the offset received to the previously received offset to determine if a step change has occurred, and can adjust the received timestamp value accordingly.

At 1202, a Timestamp$_{Received}$ (received timestamp) can be determined by the destination node and stored in a database. At 1204 Dest$_{Offset}$ (current value of the local clock time offset at the destination) can be determined at the destination node and collected in the database. At 1206, a Dest$_{LastOffset}$ (previous value of the local clock time offset at the destination) can be determined and sent to the database for future retrieval. At 1208, the value of (Dest$_{Offset}$−Dest$_{LastOffset}$) can be calculated by the time sync component within the time synchronization component and the result can be stored for future access in the database. A Source$_{Offset}$ (received value of the local clock time offset from the source) can be determined at 1210. A Source$_{LastOffset}$, which can represent the previous value of the local clock time offset from the source, can be determined at the 1212. At 1214 the value of (Dest$_{Offset}$−Dest$_{LastOffset}$) can be calculated. At 1216, a calculation can be performed to determine a Timestamp$_{Compensated}$ value. Such a value can be the sum of Timestamp$_{Received}$+(Dest$_{Offset}$−Dest$_{LastOffset}$)−(Source$_{Offset}$−Source$_{LastOffset}$).

At 1218 the absolute value of (Dest$_{Offset}$−Dest$_{LastOffset}$)−(Source$_{Offset}$−Source$_{LastOffset}$) is calculated and at 1220 if that value is greater than a SyncBoundsLimit the method is repeated starting at 1202. If the value of (Dest$_{Offset}$−Dest$_{LastOffset}$)−(Source$_{Offset}$−Source$_{LastOffset}$) is less than or equal to SyncBoundsLimit then the last offsets are updated at 1222. SyncBoundsLimit can be a relatively small number ($\leq 100$) that defines the synchronization bounds for the application. The time related data can be stored in the database depending on content, the size of the data, relevance of the data to the company's expected needs, priority of the data, cost of the data, likelihood of future use, utility of the data, etc.

Figure 13:
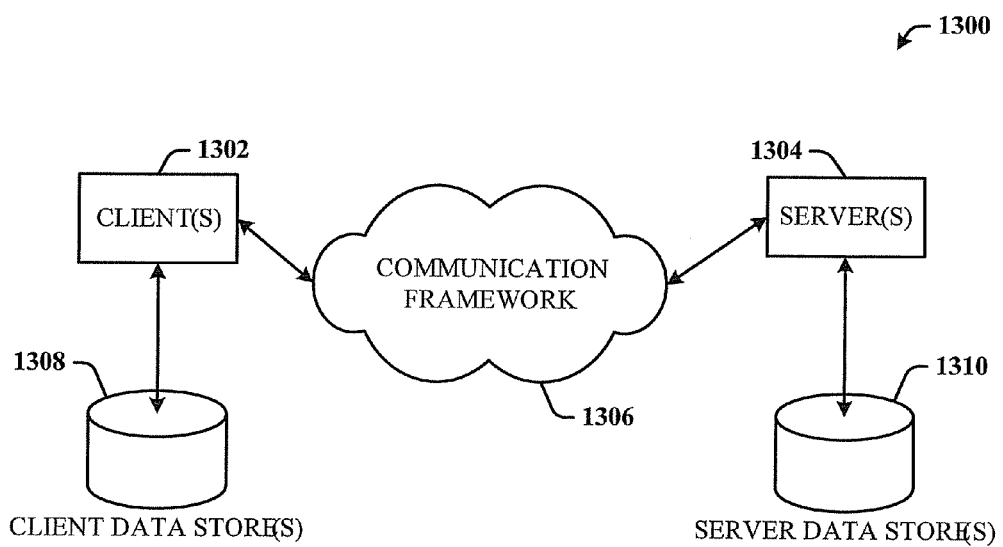
FIG. 13 illustrates a schematic block diagram of an exemplary computing environment operable to execute the disclosed embodiments.
Figure 14:
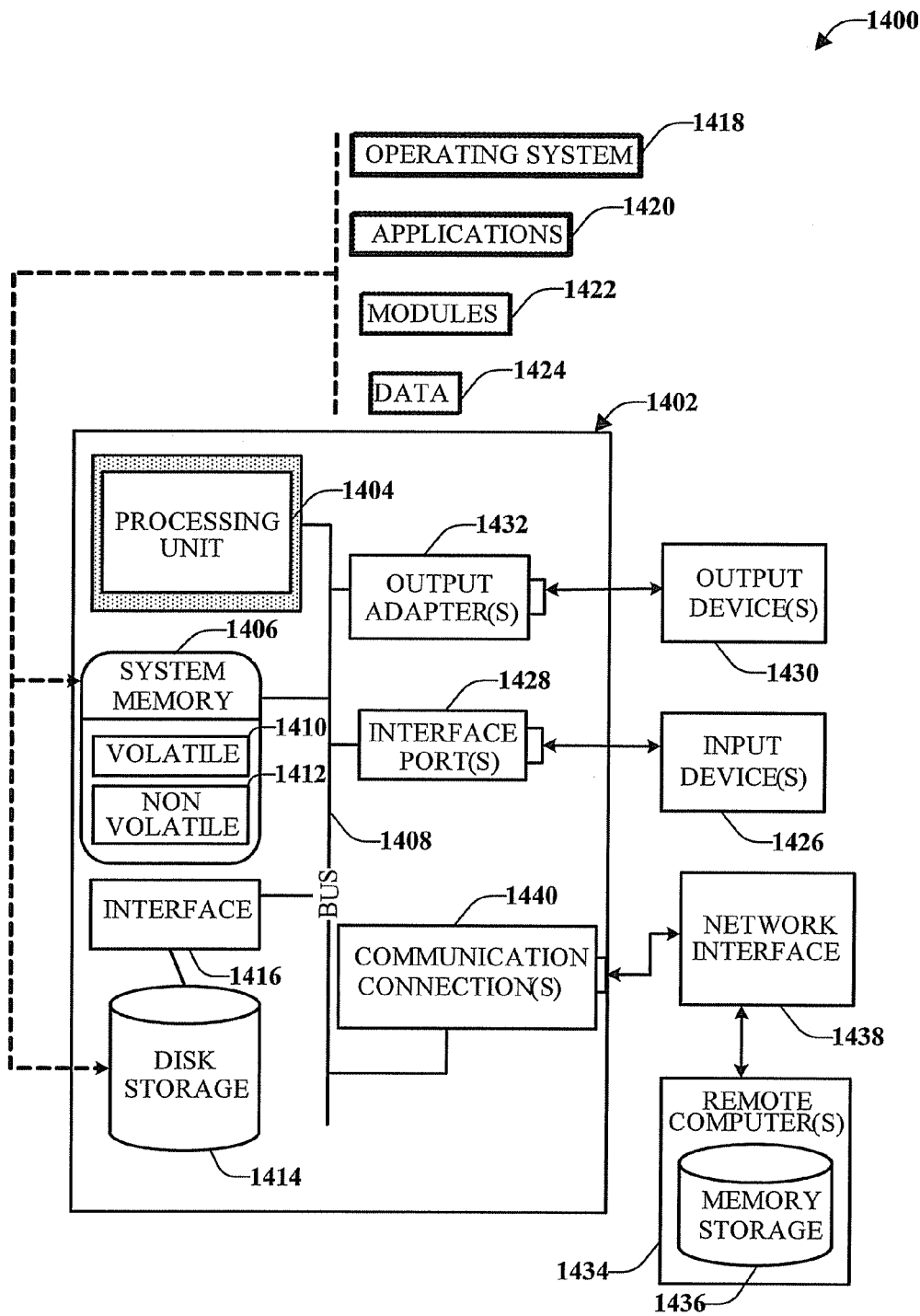
FIG. 14 illustrates a block diagram of a computer operable to execute the disclosed embodiments.

FIGS. 13 and 14 and the following discussion is intended to provide a brief, general description of a suitable computing environment in which the various aspects disclosed herein may be implemented. While the embodiments have been described above in the general context of computer-executable instructions of a computer program that runs on a local computer and/or remote computer, those skilled in the art will recognize that the embodiments also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based and/or programmable consumer electronics, and the like, each of which may operatively communicate with one or more associated devices. The illustrated aspects may also be practiced in distributed computing environments where certain tasks are performed by remote processing devices that are linked through a communications network. However, some, if not all, aspects of the embodiments may be practiced on stand-alone computers. In a distributed computing environment, program modules may be located in local and/or remote memory storage devices.

FIG. 13 is a schematic block diagram of a sample-computing environment 1300 with which the various embodiments can interact. The system 1300 includes one or more client(s) 1302. The client(s) 1302 can be hardware and/or software (e.g., threads, processes, computing devices). The system 1300 also includes one or more server(s) 1304. The server(s) 1304 can be hardware and/or software (e.g., threads, processes, computing devices). The servers 1304 can house threads to perform transformations by employing one or more embodiment, for example.

One possible communication between a client 1302 and a server 1304 can be in the form of a data packet adapted to be transmitted between two or more computer processes. The system 1300 includes a communication framework 1306 that can be employed to facilitate communications between the client(s) 1302 and the server(s) 1304. The client(s) 1302 are operably connected to one or more client data store(s) 1308 that can be employed to store information local to the client(s) 1302. Similarly, the server(s) 1304 are operably connected to one or more server data store(s) 1310 that can be employed to store information local to the servers 1304.

With reference to FIG. 14, an exemplary environment 1400 for implementing various aspects disclosed herein includes a computer 1402. The computer 1402 includes a processing unit 1404, a system memory 1406, and a system bus 1408. The system bus 1408 couples system components including, but not limited to, the system memory 1406 to the processing unit 1404. The processing unit 1404 can be any of various available processors. Dual microprocessors and other multiprocessor architectures also can be employed as the processing unit 1404.

The system bus 1408 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1406 includes volatile memory 1410 and nonvolatile memory 1412. The basic input/output system (BIOS), containing the basic routines to transfer information between elements within the computer 1402, such as during start-up, is stored in nonvolatile memory 1412. By way of illustration, and not limitation, nonvolatile memory 1412 can include read only memory (ROM), programmable ROM (PROM), electrically programmable ROM (EPROM), electrically erasable ROM (EEPROM), or flash memory. Volatile memory 1410 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1402 also includes removable/non-removable, volatile/non-volatile computer storage media. FIG. 14 illustrates, for example a disk storage 1414. Disk storage 1414 includes, but is not limited to, devices like a magnetic disk drive, floppy disk drive, tape drive, Jaz drive, Zip drive, LS-130 drive, flash memory card, or memory stick. In addition, disk storage 1414 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1414 to the system bus 1408, a removable or non-removable interface is typically used such as interface 1416.

It is to be appreciated that FIG. 14 describes software that acts as an intermediary between users and the basic computer resources described in the suitable operating environment 1400. Such software includes an operating system 1418. Operating system 1418, which can be stored on disk storage 1414, acts to control and allocate resources of the computer system 1402. System applications 1420 take advantage of the management of resources by operating system 1418 through program modules 1422 and program data 1424 stored either in system memory 1406 or on disk storage 1414. It is to be appreciated that the various embodiments can be implemented with various operating systems or combinations of operating systems.

A user enters commands or information into the computer 1402 through input device(s) 1426. Input devices 1426 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1404 through the system bus 1408 through interface port(s) 1428. Interface port(s) 1428 include, for example, a serial port, a parallel port, a game port, and a universal serial bus (USB). Output device(s) 1430 use some of the same type of ports as input device(s) 1426. Thus, for example, a USB port may be used to provide input to computer 1402, and to output information from computer 1402 to an output device 1430. Output adapter 1432 is provided to illustrate that there are some output devices 1430 like monitors, speakers, and printers, among other output devices 1430, which require special adapters. The output adapters 1432 include, by way of illustration and not limitation, video and sound cards that provide a means of connection between the output device 1430 and the system bus 1408. It should be noted that other devices and/or systems of devices provide both input and output capabilities such as remote computer(s) 1434.

Computer 1402 can operate in a networked environment using logical connections to one or more remote computers, such as remote computer(s) 1434. The remote computer(s) 1434 can be a personal computer, a server, a router, a network PC, a workstation, a microprocessor based appliance, a peer device or other common network node and the like, and typically includes many or all of the elements described relative to computer 1402. For purposes of brevity, only a memory storage device 1436 is illustrated with remote computer(s) 1434. Remote computer(s) 1434 is logically connected to computer 1402 through a network interface 1438 and then physically connected by communication connection 1440. Network interface 1438 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1440 refers to the hardware/software employed to connect the network interface 1438 to the bus 1408. While communication connection 1440 is shown for illustrative clarity inside computer 1402, it can also be external to computer 1402. The hardware/software necessary for connection to the network interface 1438 includes, for exemplary purposes only, internal and external technologies such as, modems including regular telephone grade modems, cable modems and DSL modems, ISDN adapters, and Ethernet cards.

What has been described above includes examples of the various embodiments. It is, of course, not possible to describe every conceivable combination of components or methodologies for purposes of describing the embodiments, but one of ordinary skill in the art may recognize that many further combinations and permutations of the various embodiments are possible. Accordingly, the detailed description and attached appendices are intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the various embodiments. In this regard, it will also be recognized that the one or more embodiments includes a system as well as a computer-readable medium having computer-executable instructions for performing the acts and/or events of the various methods of the embodiments.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term a "comprising."

What is claimed is:

1. A system that enables time synchronization, comprising:
   a timestamp component that captures timestamps and offsets from at least one network node; and
   a time synch component that identifies step changes to at least one master clock, based in part on calculating a compensated timestamp, and synchronizes a local clock time of the at least one network node with the identified step change.

2. The system of claim 1, the timestamp component stores timestamps and offsets captured from at least one source node and at least one destination node.

3. The system of claim 1, utilizing at least one of American Inter Range Instrumentation Group (IRIG-B), Network Time Protocol (NTB), Telecommunications Working Group (TCWG), Global Positioning System (GPS), Precision Time Protocol (PTP) and Flooding Time Synchronization Protocol (FTSP).

4. The system of claim 1, each network node maintains a local time independent from other nodes and all nodes maintain a common understanding of system time.

5. The system of claim 4, the time synch component further determines whether to adjust local clocks to system time based on data from the timestamp component.

6. The system of claim 1, further comprising a database that stores at least one of the local clock times, the system time, at least one system event, at least one fault occurrence, a grandmaster clock identification, and a master clock identification.

7. The system of claim 1, the timestamp component stores the timestamps and offsets in a database utilizing a Common Industrial Protocol (CIP) Network.

8. The system of claim 7, the common industrial protocol is at least one of: DeviceNet, ControlNet, EtherNet/IP, EtherCAT, Profinet, SERCOS, CAN, Precision Time Protocol and Modbus.

9. The system of claim 1, the at least one master clock is at least one of a microprocessor, an embedded controller, a programmable logic controller, a programmable automation controllers, a switch, an I/O device, a standalone GPS, an integrated GPS, a NTP time keepers, machine clocks and computer clocks.

10. The system of claim 1, the at least one local clock is at least one of a microprocessor, an embedded controller, a programmable logic controller, a programmable automation controllers, a switch, an I/O device, a standalone GPS, an integrated GPS, a NTP time keepers, machine clocks and computer clocks.

11. The system of claim 1, a communication path between nodes is at least one of: internet, DeviceNet, ControlNet, CANopen, hard-wire networks, wireless, ARCNET, Token Ring, FDDI, local area network (LAN), wide area network (WAN), EthernetIP and Ethernet.

12. The system of claim 1, further comprising an interface switch that receives communications utilizing at least one of TCP/IP data packets, MSMQ, MQTT, MQ, JMS, RMI, inter-process communication and web services.

13. The system of claim 1, the time synch component can provide an indication of system time synchronization utilizing at least one of: a flashing light, a sound, an e-mail, a page and a voice message.

14. A system that enables time synchronization, comprising:
- a timestamp component that captures timestamps and offsets from at least one network node;
- a time synch component that identifies step changes to at least one master clock and synchronizes a local clock time of the at least one network node with the identified step change; and
- a group startup sequence that allows a group of devices to synchronize respective clocks to the master clock before starting an application that depends on the system time.

15. The system of claim 14, the timestamp component stores timestamps and offsets captured from at least one source node and at least one destination node.

16. The system of claim 14, utilizing at least one of American Inter Range Instrumentation Group (IRIG-B), Network Time Protocol (NTB), Telecommunications Working Group (TCWG), Global Positioning System (GPS), Precision Time Protocol (PTP) and Flooding Time Synchronization Protocol (FTSP).

17. The system of claim 14, each network node maintains a local time independent from other nodes and all nodes maintain a common understanding of system time.

18. The system of claim 17, the time synch component further determines whether to adjust local clocks to system time based on data from the timestamp component.

19. The system of claim 14, further comprising a database that stores at least one of the local clock times, the system time, at least one system event, at least one fault occurrence, a grandmaster clock identification, and a master clock identification.

20. The system of claim 14, the timestamp component stores the timestamps and offsets in a database utilizing a Common Industrial Protocol (CIP) Network.

21. The system of claim 20, the common industrial protocol is at least one of: DeviceNet, ControlNet, EtherNet/IP, EtherCAT, Profinet, SERCOS, CAN, Precision Time Protocol and Modbus.

22. The system of claim 14, the at least one master clock is at least one of a microprocessor, an embedded controller, a programmable logic controller, a programmable automation controllers, a switch, an I/O device, a standalone GPS, an integrated GPS, a NTP time keepers, machine clocks and computer clocks.

23. The system of claim 14, the at least one local clock is at least one of a microprocessor, an embedded controller, a programmable logic controller, a programmable automation controllers, a switch, an I/O device, a standalone GPS, an integrated GPS, a NTP time keepers, machine clocks and computer clocks.

24. The system of claim 14, a communication path between nodes is at least one of: internet, DeviceNet, ControlNet, CANopen, hard-wire networks, wireless, ARCNET, Token Ring, FDDI, local area network (LAN), wide area network (WAN), EthernetIP and Ethernet.

25. The system of claim 14, further comprising an interface switch that receives communications utilizing at least one of TCP/IP data packets, MSMQ, MQTT, MQ, JMS, RMI, inter-process communication and web services.

26. The system of claim 14, the time synch component can provide an indication of system time synchronization utilizing at least one of: a flashing light, a sound, an e-mail, a page and a voice message.

27. A method for enabling node timestamp time synchronization with a master clock step change employing timestamps received at a single node, comprising:
- receiving a first timestamp associated with a first offset and a second timestamp associated with a second offset;
- calculating a compensated timestamp based in part of the first timestamp and associated offset and the second offset;
- determining if a step change has occurred; and
- selectively updating the second timestamp and associated second offset if a step change has occurred.

28. The method of claim 27, determining if a step change has occurred further comprising:
- comparing the second offset to the first offset; and
- determining a difference between the first offset and the second offset.

29. The method of claim 27, selectively updating the second timestamp and associated offset synchronizes the second timestamp and associated second offset with a master clock.

30. The method of claim 27, further comprising storing the first timestamp and associated first offset in a database.

31. The method of claim 30, the first timestamp and associated first offset are stored in a database based on at least one of a content, a data size, a data relevance, a data priority, a data cost, a future use, and a data utility.

32. A method for compensation of timestamps between a source node and a destination node, comprising:
- receiving at a destination node a source offset and an associated timestamp from a source node;
- comparing the source offset to an offset previously received at the destination node to determine a step change; and
- selectively adjusting the received timestamp and associated offset based on the determined step change.

* * * * *